US011951437B2

(12) United States Patent
Ikemiya et al.

(10) Patent No.: US 11,951,437 B2
(45) Date of Patent: Apr. 9, 2024

(54) INSIDE AIR CONTROL SYSTEM, REFRIGERATION APPARATUS, AND TRANSPORT CONTAINER

(71) Applicant: DAIKIN INDUSTRIES, LTD., Osaka (JP)

(72) Inventors: Makoto Ikemiya, Osaka (JP); Kouji Yamamoto, Osaka (JP); Noritaka Kamei, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/381,812

(22) Filed: Oct. 19, 2023

(65) Prior Publication Data

US 2024/0042372 A1 Feb. 8, 2024

Related U.S. Application Data

(63) Continuation of application No. PCT/JP2022/010828, filed on Mar. 11, 2022.

(30) Foreign Application Priority Data

Apr. 20, 2021 (JP) ................................ 2021-070968

(51) Int. Cl.
*B01D 53/047* (2006.01)
*A23B 7/148* (2006.01)
(Continued)

(52) U.S. Cl.
CPC ............ *B01D 53/047* (2013.01); *A23B 7/148* (2013.01); *B01D 53/261* (2013.01);
(Continued)

(58) Field of Classification Search
CPC ................ B01D 53/047; B01D 53/261; B01D 2253/108; B01D 2257/102;
(Continued)

(56) References Cited

U.S. PATENT DOCUMENTS 4,142,372 A 3/1979 Kato et al.
5,084,075 A * 1/1992 Sircar ................ B01D 53/0476 95/103

(Continued)

FOREIGN PATENT DOCUMENTS

EP 0 888 804 A2 1/1999
JP 2016-161191 A 9/2016

(Continued)

OTHER PUBLICATIONS

Decision to Grant a Patent issued in Japanese Patent Application 2021-070968, dated May 2, 2022.

(Continued)

*Primary Examiner* — Frank M Lawrence, Jr.
(74) *Attorney, Agent, or Firm* — Birch, Stewart, Kolasch & Birch, LLP

(57) ABSTRACT

In an inside air control system, a first pump supplies treatment target air to an adsorption vessel, and a second pump sucks gas from the adsorption vessel. In an adjustment operation of adjusting the composition of air in a storage, the inside air control system alternately performs a first action and a second action. When a stop condition for stopping the adjustment operation is satisfied, a controller performs stop control. In the stop control, the controller controls the second pump to suck the gas from the adsorption vessel to which the first pump supplies the treatment target air when the stop condition is satisfied, and controls the second pump to stop after the second pump has operated for a first time T1.

12 Claims, 9 Drawing Sheets

(51) Int. Cl.

| | |
|---|---|
| ***B01D 53/26*** | (2006.01) |
| ***B65D 81/26*** | (2006.01) |
| ***B65D 85/50*** | (2006.01) |
| ***B65D 85/52*** | (2006.01) |
| ***F25D 17/04*** | (2006.01) |

(52) U.S. Cl.

CPC ......... *B65D 81/266* (2013.01); *B65D 85/505* (2013.01); *B65D 85/52* (2013.01); *F25D 17/042* (2013.01); *B01D 2253/108* (2013.01); *B01D 2257/102* (2013.01); *B01D 2257/80* (2013.01); *B01D 2258/06* (2013.01); *B01D 2259/40003* (2013.01); *B01D 2259/40009* (2013.01); *B01D 2259/402* (2013.01); *F25D 2317/0411* (2013.01); *F25D 2317/0413* (2013.01)

(58) Field of Classification Search

CPC ............ B01D 2257/80; B01D 2258/06; B01D 2259/40003; B01D 2259/40009; B01D 2259/402; A23B 7/148; B65D 81/266; B65D 85/505; B65D 85/52; F25D 17/042; F25D 2317/0411; F25D 2317/0413

USPC ........................... 96/108, 111, 115, 121, 126

See application file for complete search history.

(56) References Cited

U.S. PATENT DOCUMENTS

| | | | | |
|---|---|---|---|---|
| 2002/0033023 | A1 | 3/2002 | Kroll et al. | |
| 2008/0282883 | A1* | 11/2008 | Rarig | B01D 53/047 96/113 |
| 2010/0071698 | A1 | 3/2010 | Kiritake | |
| 2018/0235247 | A1 | 8/2018 | Kamei et al. | |
| 2020/0229454 | A1* | 7/2020 | Tagawa | B01D 46/0002 |
| 2020/0253226 | A1 | 8/2020 | Kamei et al. | |
| 2020/0254384 | A1 | 8/2020 | Kamei et al. | |
| 2021/0268431 | A1 | 9/2021 | Kamei et al. | |

FOREIGN PATENT DOCUMENTS

| | | | |
|---|---|---|---|
| JP | 2017-219287 | A | 12/2017 |
| WO | WO 2008/136540 | A1 | 11/2008 |
| WO | WO 2017/038056 | A1 | 3/2017 |
| WO | WO 2019/065885 | A1 | 4/2019 |

OTHER PUBLICATIONS

International Search Report (PCT/ISA/210) issued in PCT/JP2022/010828, dated May 24, 2022.

International Preliminary Report on Patentability and English translation of the Written Opinion of the International Searching Authority for International Application No. PCT/JP2022/010828, dated Nov. 2, 2023.

Extended European Search Report dated Feb. 19, 2024 in EP 22791397.7.

Schulte et al., "Nitrogen generation by pressure swing adsoption based on carbon molecular sieves", Gas Separation & Purification, vol. 7, No. 4, Jan. 1, 1993, pp. 253-257, XP9312546, ISSN: 0950-4214.

* cited by examiner

INSIDE AIR CONTROL SYSTEM, REFRIGERATION APPARATUS, AND TRANSPORT CONTAINER

CROSS REFERENCE TO RELATED APPLICATIONS

This application is a Continuation of PCT International Application No. PCT/JP2022/010828, filed on Mar. 11, 2022, which claims priority under 35 U.S.C. 119(a) to Patent Application No. 2021-070968, filed in Japan on Apr. 20, 2021, all of which are hereby expressly incorporated by reference into the present application.

TECHNICAL FIELD

The present disclosure relates to an inside air control system, a refrigeration apparatus, and a transport container.

BACKGROUND ART

Patent Document 1 discloses an inside air control system that adjusts the composition of inside air in a transport container. To maintain freshness of, e.g., fruits and vegetables stored in the transport container, this inside air control system adjusts the oxygen concentration and carbon dioxide concentration of inside air.

The inside air control system of Patent Document 1 is a so-called pressure swing adsorption (PSA) type gas separation device. This inside air control system includes an adsorption vessel filled with an adsorbent. The inside air control system performs an action of supplying outside air (atmospheric air) to the adsorption vessel to adsorb nitrogen in the outside air by the adsorbent and an action of decompressing the adsorption vessel using a decompression-side pump to desorb nitrogen from the adsorbent. Gas sucked from the adsorption vessel by the decompression-side pump is nitrogen-enriched gas having a higher nitrogen concentration than that of the outside air. The inside air control system supplies the nitrogen-enriched gas discharged by the decompression-side pump to the inside of the transport container to decrease the oxygen concentration of the inside air.

CITATION LIST

Patent Document

Patent Document 1: Japanese Unexamined Patent Publication No. 2017-219287

SUMMARY

A first aspect of the present disclosure is directed to an inside air control system (100) for performing an adjustment operation of adjusting the composition of inside air in a storage (2). The inside air control system (100) of this aspect includes a first adsorption vessel (234) and a second adsorption vessel (235) each having an adsorbent for adsorbing nitrogen and water, a first pump (231*a*) configured to supply treatment target air to the first adsorption vessel (234) and the second adsorption vessel (235), a second pump (231*b*) which is an oilless pump configured to suck gas from the first adsorption vessel (234) and the second adsorption vessel (235) and supply the gas into the storage (2), a switching mechanism (320) configured to switch between a flow path of the treatment target air discharged by the first pump (231*a*) and a flow path of the gas sucked into the second pump (231*b*), and a controller (110) configured to control the first pump (231*a*), the second pump (231*b*), and the switching mechanism (320). In the adjustment operation, the controller (110) controls the switching mechanism (320) to alternately perform a first action in which the first pump (231*a*) supplies the treatment target air to the first adsorption vessel (234) and the second pump (231*b*) sucks the gas from the second adsorption vessel (235) and a second action in which the first pump (231*a*) supplies the treatment target air to the second adsorption vessel (235) and the second pump (231*b*) sucks the gas from the first adsorption vessel (234). When a stop condition for stopping the adjustment operation is satisfied, the controller (110) controls the switching mechanism (320) such that the second pump (231*b*) sucks the gas from one of the first adsorption vessel (234) or the second adsorption vessel (235), to which the first pump (231*a*) supplies the treatment target air, when the stop condition is satisfied, and performs stop control for stopping the second pump (231*b*) after having operated the second pump (231*b*) for a predetermined first time.

DESCRIPTION OF EMBODIMENTS

Hereinafter, embodiments of the present disclosure will be described with reference to the drawings.

The present disclosure relates to a transport container (1). This transport container (1) is a reefer container capable of controlling the internal temperature thereof. The transport container (1) is used to transport fresh products (e.g., fruits, vegetables, and flowers and ornamental plants) which breathe by absorbing oxygen ($O_2$) in the air and releasing carbon dioxide ($CO_2$) into the air.

Figure 1:
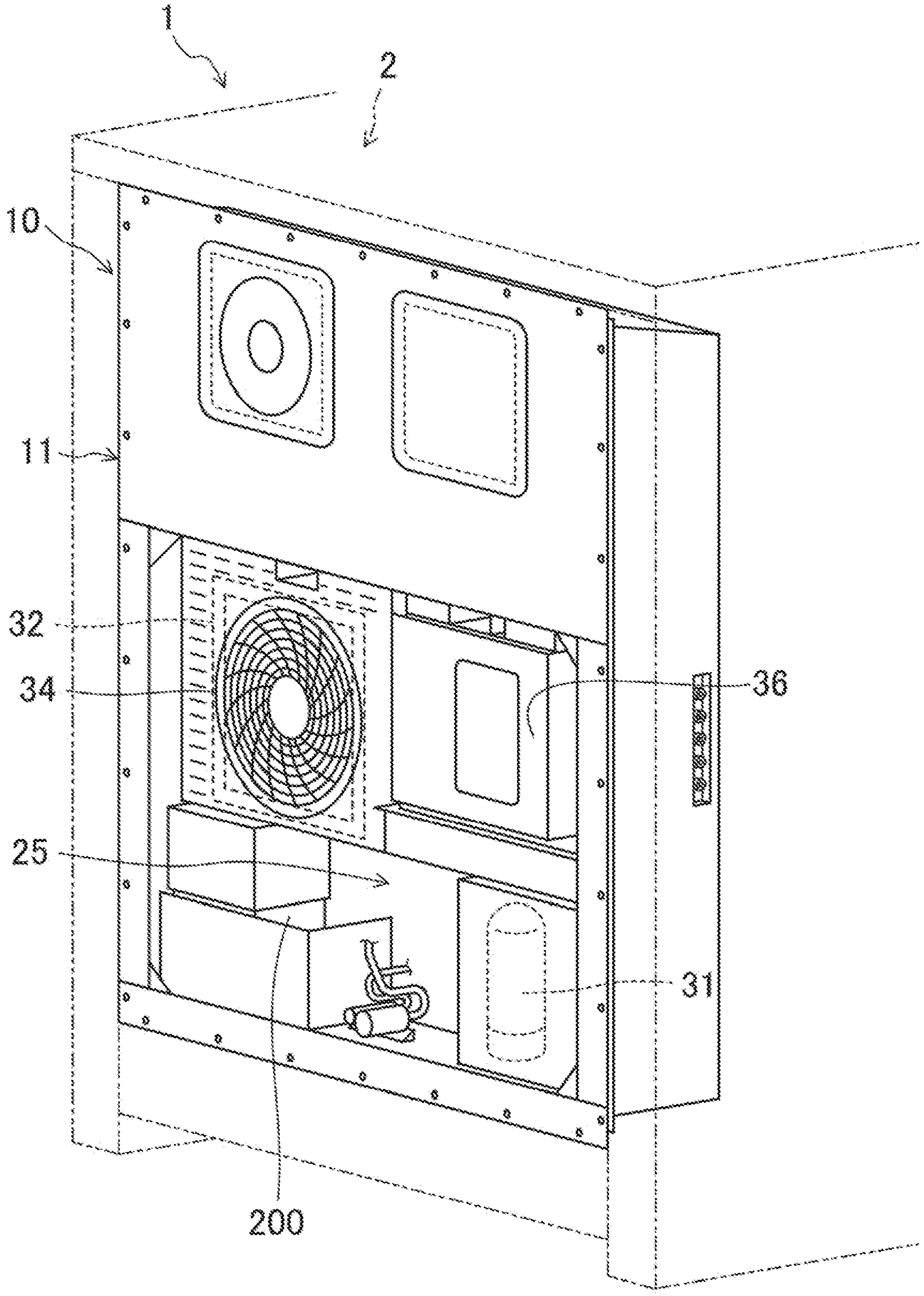
FIG. 1 is a perspective view illustrating a transport container of an embodiment viewed from the front side.

As illustrated in FIG. 1, the transport container (1) includes a container body (2) and a transport refrigeration apparatus (10) provided in the container body (2). The transport container (1) is used for marine transportation. The transport container (1) is conveyed by a marine transporter such as a ship.

—Container Body—

The container body (2) is a storage for storing the above-described fresh products.

The container body (2) is formed in a hollow box-like shape. The container body (2) is formed to be horizontally long. The container body (2) has an opening formed at one end in the longitudinal direction. The refrigeration apparatus (10) for transport closes the opening of the container body (2). The container body (2) forms therein a storage space (5) for storing articles to be transported.

—Refrigeration Apparatus for Transport—

The refrigeration apparatus (10) for transport is attached to the opening of the container body (2). The refrigeration apparatus (10) for transport includes a casing (11) and a refrigerant circuit (30). The refrigeration apparatus (10) for transport adjusts the temperature of air (inside air) in the storage space (5).

<Casing>

Figure 2:
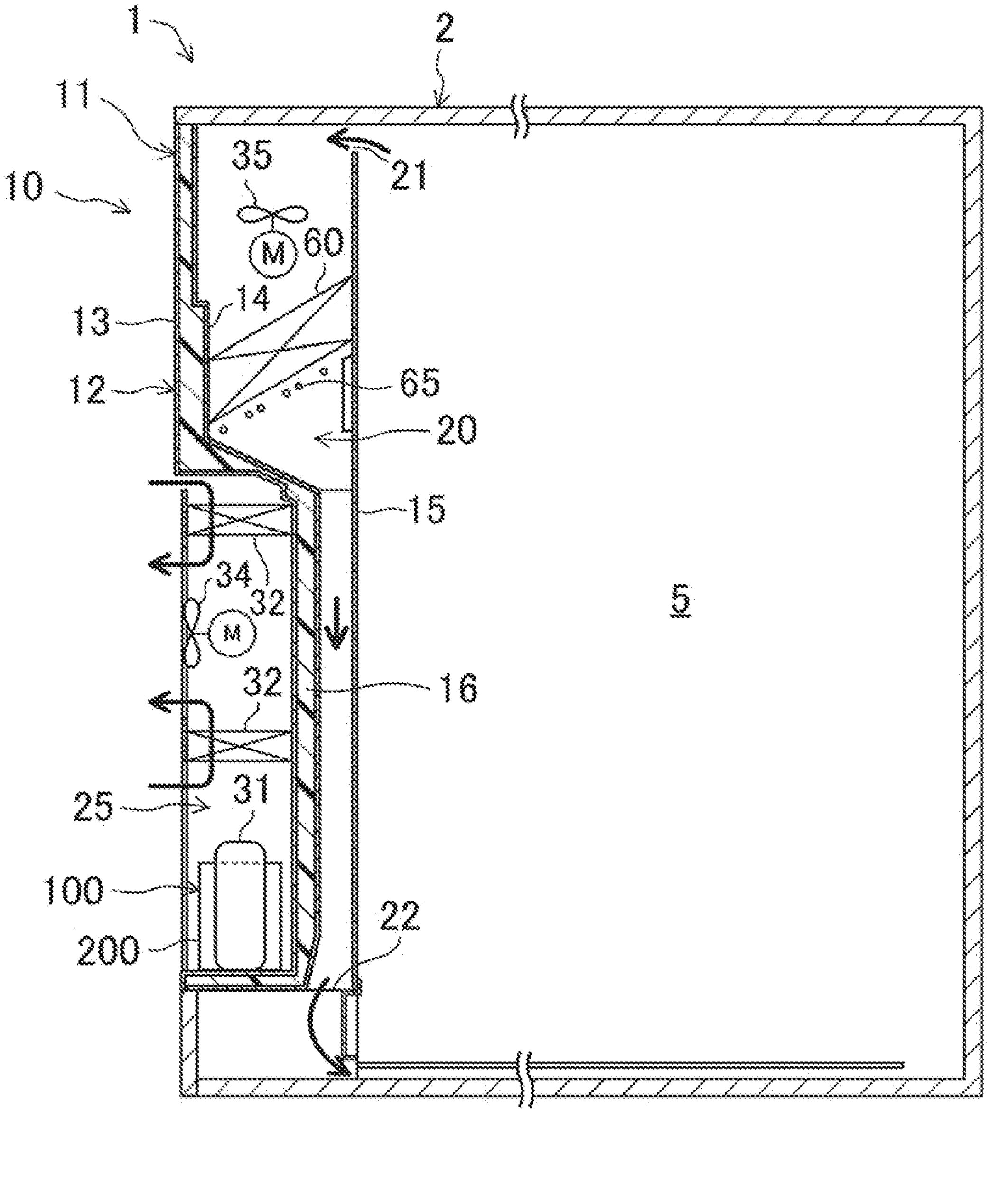
FIG. 2 is a longitudinal sectional view schematically illustrating an internal structure of the transport container of the embodiment.

As illustrated in FIG. 2, the casing (11) includes a division wall (12) and a partition plate (15).

An internal flow path (20) is formed inside the division wall (12). An external chamber (25) is formed outside the division wall (12). The division wall (12) separates the internal flow path (20) from the external chamber (25).

The division wall (12) includes an external wall (13) and an internal wall (14). The external wall (13) is located outside the container body (2). The internal wall (14) is located inside the container body (2).

The external wall (13) closes the opening of the container body (2). The external wall (13) is attached to a peripheral portion of the opening of the container body (2). A lower portion of the external wall (13) bulges toward the inside of the container body (2). The external chamber (25) is formed inside the bulging external wall (13).

The internal wall (14) faces the external wall (13). The internal wall (14) has a shape conforming to the external wall (13). The internal wall (14) is spaced apart from the external wall (13). A thermal insulator (16) is provided between the internal wall (14) and the external wall (13).

The partition plate (15) is arranged further inward of the container body (2) than the internal wall (14). The internal flow path (20) is formed between the division wall (12) and the partition plate (15). An inflow port (21) is formed between the upper end of the partition plate (15) and a top panel of the container body (2). An outflow port (22) is formed between the lower end of the partition plate (15) and the lower end of the division wall (12). The internal flow path (20) extends from the inflow port (21) to the outflow port (22).

<Components of Refrigerant Circuit>

The refrigerant circuit (30) is filled with refrigerant. The refrigerant circulates in the refrigerant circuit (30) to perform a vapor compression refrigeration cycle. The refrigerant circuit (30) includes a compressor (31), an external heat exchanger (32), an expansion valve (33), an internal heat exchanger (60), and a refrigerant pipe connecting these components.

The compressor (31) is arranged in a lower portion of the external chamber (25). The external heat exchanger (32) is arranged in an upper portion of the external chamber (25). The external heat exchanger (32) is a fin-and-tube heat exchanger that exchanges heat between the refrigerant and outside air. The external heat exchanger (32) has a generally rectangular tubular shape. The internal heat exchanger (60) is arranged in the internal flow path (20). The internal heat exchanger (60) is a fin-and-tube heat exchanger that exchanges heat between the refrigerant and inside air.

<External Fan>

The refrigeration apparatus (10) for transport includes a single external fan (34). The external fan (34) is a propeller fan. The external fan (34) is arranged in the external chamber (25). The external fan (34) is arranged inside the external heat exchanger (32) formed in a tubular shape. The external fan (34) sends the outside air to the external heat exchanger (32).

<Internal Fan>

The refrigeration apparatus (10) for transport includes two internal fans (35). The internal fans (35) are propeller fans. The internal fans (35) are arranged in the internal flow path (20). The internal fans (35) are arranged above the internal heat exchanger (60). The internal fans (35) supply the inside air to the internal heat exchanger (60).

<Heater>

The refrigeration apparatus (10) for transport includes a heater (65). The heater (65) is arranged below the internal heat exchanger (60). The heater (65) is used to defrost the internal heat exchanger (60).

<Electric Component Box>

As illustrated in FIG. 1, the refrigeration apparatus (10) for transport includes an electric component box (36). The electric component box (36) is arranged in an upper portion of the external chamber (25). The electric component box (36) houses electric components such as an inverter board and a control board.

—Configuration of Refrigerant Circuit—

Figure 3:
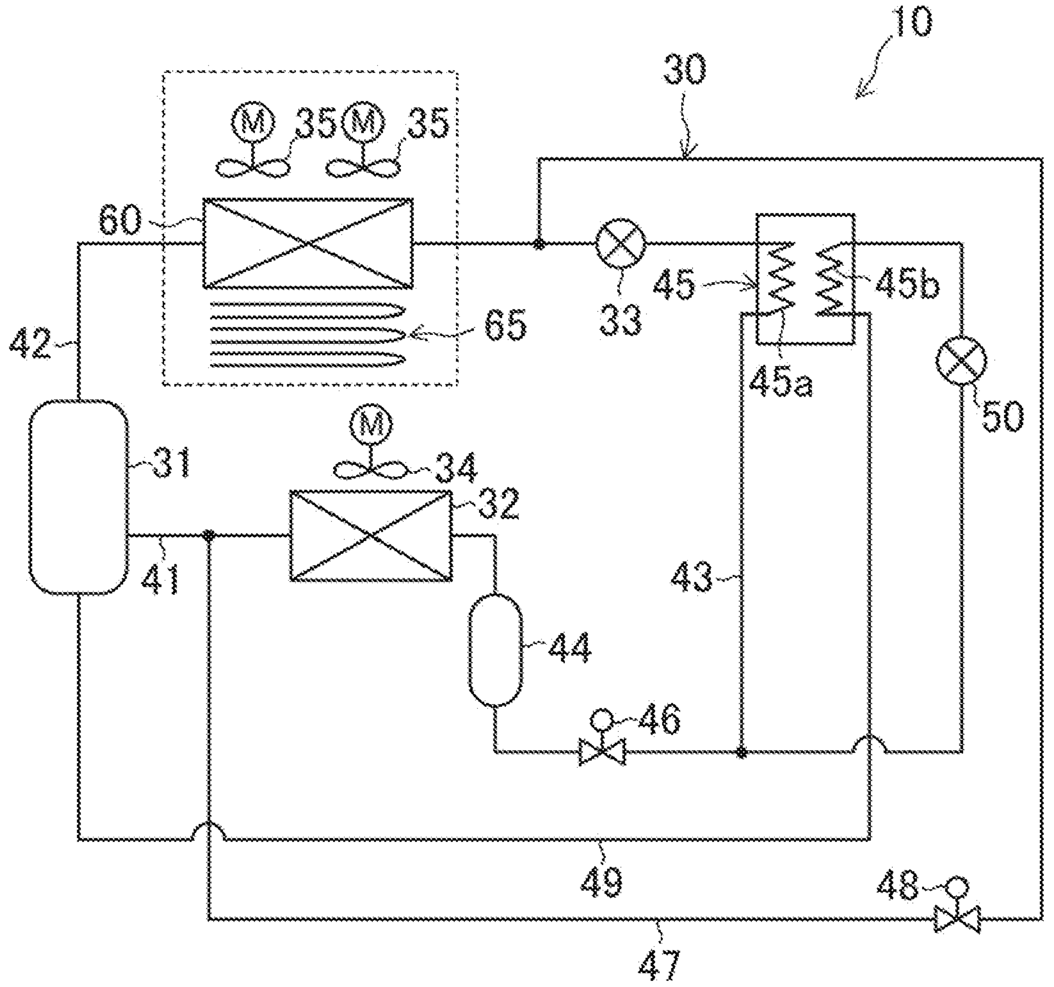
FIG. 3 is a piping system diagram of a refrigerant circuit of a refrigeration apparatus for transport of the embodiment.

The configuration of the refrigerant circuit (30) will be described with reference to FIG. 3.

The refrigerant circuit (30) includes, as main components, the compressor (31), the external heat exchanger (32), the expansion valve (33), and the internal heat exchanger (60). The expansion valve (33) is an electronic expansion valve having a variable opening degree.

The refrigerant circuit (30) has a discharge pipe (41) and a suction pipe (42). One end of the discharge pipe (41) is connected to a discharge portion of the compressor (31). The other end of the discharge pipe (41) is connected to a gas end of the external heat exchanger (32). One end of the suction pipe (42) is connected to a suction portion of the compressor (31). The other end of the suction pipe (42) is connected to a gas end of the internal heat exchanger (60).

The refrigerant circuit (30) includes a liquid pipe (43), a receiver (44), a cooling heat exchanger (45), a first refrigerant on-off valve (46), a connecting pipe (47), a second refrigerant on-off valve (48), an injection pipe (49), and an injection valve (50).

One end of the liquid pipe (43) is connected to a liquid end of the external heat exchanger (32). The other end of the liquid pipe (43) is connected to a liquid end of the internal heat exchanger (60). The receiver (44) is provided for the liquid pipe (43). The receiver (44) is a container that stores the refrigerant.

The cooling heat exchanger (45) has a first flow path (45*a*) and a second flow path (45*b*). The cooling heat exchanger (45) exchanges heat between the refrigerant in the first flow path (45*a*) and the refrigerant in the second flow path (45*b*). The cooling heat exchanger (45) is, for example, a plate heat exchanger. The first flow path (45*a*) is provided in the liquid pipe (43). The second flow path (45*b*) is provided in the injection pipe (49). The cooling heat exchanger (45) cools the refrigerant flowing through the liquid pipe (43).

The first refrigerant on-off valve (46) is arranged in the liquid pipe (43) to be located between the receiver (44) and the first flow path (45*a*). The first refrigerant on-off valve (46) is an electromagnetic valve that can be opened and closed.

The connecting pipe (47) allows a high-pressure line and low-pressure line of the refrigerant circuit (30) to communicate with each other. One end of the connecting pipe (47) is connected to the discharge pipe (41). The other end of the connecting pipe (47) is connected to the liquid pipe (43) between the expansion valve (33) and the internal heat exchanger (60).

The second refrigerant on-off valve (48) is provided for the connecting pipe (47). The second refrigerant on-off valve (48) is an electromagnetic valve that can be opened and closed.

The injection pipe (49) introduces the refrigerant into an intermediate-pressure portion of the compressor (31). One end of the injection pipe (49) is connected to the liquid pipe (43) between the receiver (44) and the first flow path (45*a*). The other end of the injection pipe (49) is connected to the intermediate-pressure portion of the compressor (31). An intermediate pressure, which is the pressure of the intermediate-pressure portion, is a pressure higher than the suction pressure and lower than the discharge pressure of the compressor (31).

The injection valve (50) is provided upstream of the second flow path (45*b*) in the injection pipe (49). The injection valve (50) is an electronic expansion valve having a variable opening degree.

—Operation and Action of Refrigeration Apparatus for Transport—

Basic operation and action of the refrigeration apparatus (10) for transport will be described. When the refrigeration apparatus (10) for transport is in operation, the compressor (31), the external fan (34), and the internal fans (35) operate. The first refrigerant on-off valve (46) opens. The second refrigerant on-off valve (48) is closed. The opening degree of the expansion valve (33) is adjusted. The opening degree of the injection valve (50) is adjusted.

The refrigerant compressed by the compressor (31) flows through the external heat exchanger (32). In the external heat exchanger (32), the refrigerant dissipates heat to the outside air to condense. The condensed refrigerant passes through the receiver (44). Part of the refrigerant having passed through the receiver (44) flows through the first flow path (45*a*) of the cooling heat exchanger (45). The remaining refrigerant having passed through the receiver (44) flows through the injection pipe (49), and is decompressed to the intermediate pressure by the injection valve (50). The decompressed refrigerant is introduced into the intermediate-pressure portion of the compressor (31).

In the cooling heat exchanger (45), the refrigerant in the second flow path (45*b*) absorbs heat from the refrigerant in the first flow path (45*a*) to evaporate. This cools the refrigerant in the first flow path (45*a*). In other words, the degree of subcooling of the refrigerant flowing through the first flow path (45*a*) increases.

The refrigerant cooled in the cooling heat exchanger (45) is decompressed to a low pressure by the expansion valve (33). The decompressed refrigerant flows through the internal heat exchanger (60). The refrigerant in the internal heat exchanger (60) absorbs heat from the inside air to evaporate. Thus, the internal heat exchanger (60) cools the inside air. The evaporated refrigerant is sucked into the compressor (31) and compressed again.

The air in the container body (2) circulates between the storage space (5) and the internal flow path (20). The internal heat exchanger (60) cools the inside air flowing through the internal flow path (20). The inside air cooled by the internal heat exchanger (60) is supplied to the storage space (5) through the outflow port (22). In this manner, the air in the storage space (5) is cooled, and the temperature of the inside air is maintained at a predetermined target temperature.

—In-Compartment Air Conditioner—

The refrigeration apparatus (10) for transport of this embodiment includes an inside air control system (100).

The inside air control system (100) is provided in the refrigeration apparatus (10) for transport to provide so-called controlled atmosphere (CA) transportation. The inside air control system (100) adjusts the composition of air in the storage space (5) of the transport container (1) such that the composition of the air therein is different from that of the atmospheric air.

Figure 4:
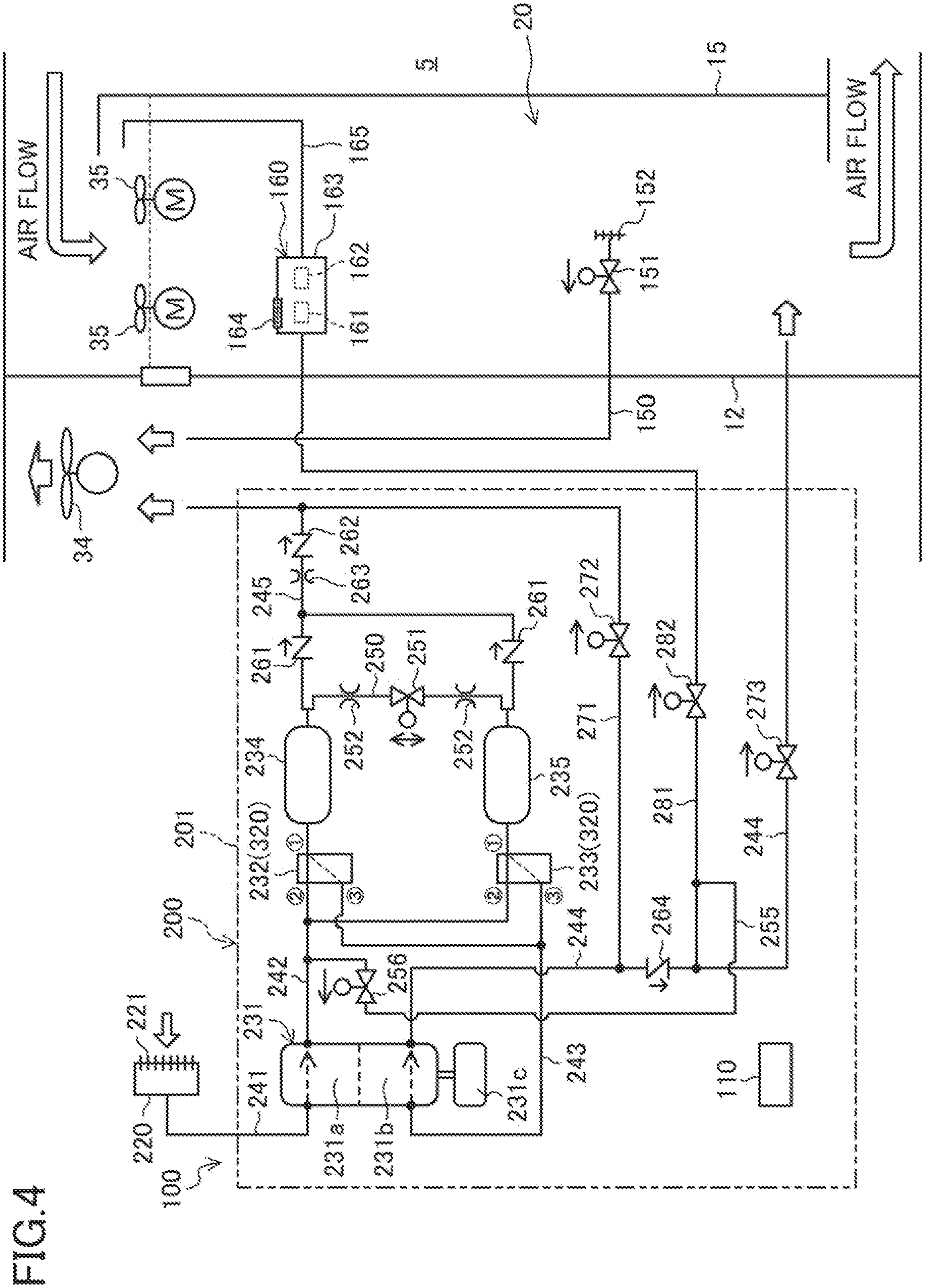
FIG. 4 is a piping system diagram illustrating the configuration of an inside air control system of the embodiment.

As illustrated in FIG. 4, the inside air control system (100) includes a filter unit (220), a main unit (200), a sensor unit (160), a ventilation exhaust pipe (150), and a controller (110).

The inside air control system (100) separates, by a so-called pressure swing adsorption (PSA) method, the outside air (atmospheric air), which is treatment target air, into nitrogen-enriched gas having a higher nitrogen concentration and a lower oxygen concentration than those of the atmospheric air and oxygen-enriched gas having a lower nitrogen concentration and a higher oxygen concentration than those of the atmospheric air.

<Filter Unit, Outside Air Pipe>

The filter unit (220) is a member formed in a box-like shape. The filter unit (220) is installed in the external chamber (25) of the refrigeration apparatus (10) for transport. The filter unit (220) includes an air filter (221). The air filter (221) is a filter for capturing dust, salt, etc. contained in the outside air. The air filter (221) of this embodiment is an air-permeable, waterproof membrane filter.

The filter unit (220) is connected to the main unit (200) via an outside air pipe (241). One end of the outside air pipe (241) is connected to the filter unit (220). The other end of the outside air pipe (241) is connected to an air pump (231) to be described later. The outside air pipe (241) guides the outside air (atmospheric air) having passed through the air filter (221) to the air pump (231) as the treatment target air.

<Main Unit>

The main unit (200) is installed in the external chamber (25) of the refrigeration apparatus (10) for transport. The main unit (200) includes the air pump (231), a first adsorption vessel (234), a second adsorption vessel (235), a first switching valve (232), a second switching valve (233), and a unit case (201) housing these components. The unit case (201) is provided with an introduction pipe (242), a suction pipe (243), a supply pipe (244), and a discharge pipe (245).

<Air Pump>

The air pump (231) includes a compression-side pump (231*a*), a decompression-side pump (231*b*), and a drive motor (231*c*). Each of the compression-side pump (231*a*) and the decompression-side pump (231*b*) sucks and discharges air. The compression-side pump (231*a*) and the decompression-side pump (231*b*) are connected to a drive shaft of one drive motor (231*c*). In the air pump (231), both the compression-side pump (231*a*) and the decompression-side pump (231*b*) are driven by one drive motor (231*c*).

The other end of the outside air pipe (241) is connected to a suction port of the compression-side pump (231*a*). One end of the introduction pipe (242) is connected to a discharge port of the compression-side pump (231*a*). The compression-side pump (231*a*) is a first pump. The compression-side pump (231*a*) sucks the treatment target air from the outside air pipe (241), and supplies the air to the first adsorption vessel (234) and the second adsorption vessel (235) through the introduction pipe (242).

The suction pipe (243) is connected to a suction port of the decompression-side pump (231*b*). The supply pipe (244) is connected to a discharge port of the decompression-side pump (231*b*). The decompression-side pump (231*b*) is a second pump. The decompression-side pump (231*b*) sucks gas from the first adsorption vessel (234) and the second adsorption vessel (235) through the suction pipe (243), and supplies the gas to the storage space (5) of the container body (2) through the supply pipe (244).

Figure 5:
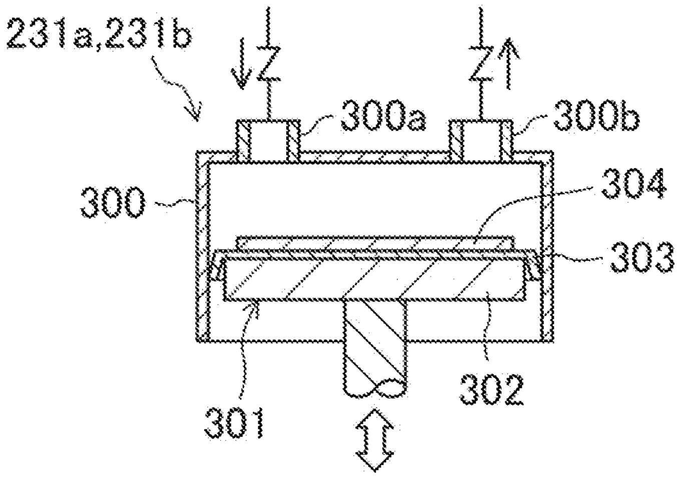
FIG. 5 is a schematic sectional view illustrating the configurations of a compression pump and a decompression pump provided in the inside air control system of the embodiment.

Each of the compression-side pump (231*a*) and the decompression-side pump (231*b*) is an oilless pump that does not use lubricant. As illustrated in FIG. 5, each of the compression-side pump (231*a*) and the decompression-side pump (231*b*) includes a cylinder (300) and a piston (301). The piston (301) is housed and reciprocates in the cylinder (300). By reciprocation of the piston (301), each of the compression-side pump (231*a*) and the decompression-side pump (231*b*) sucks gas into the cylinder (300) from a suction port (300*a*) and discharges the gas from the cylinder (300) through a discharge port (300*b*).

In each of the compression-side pump (231*a*) and the decompression-side pump (231*b*), the piston (301) includes a piston body (302), an air seal (303), and a seal fixing plate (304). The piston body (302) is a metal member formed in a discoid shape. The air seal (303) is a cap-like member that covers the outer peripheral surface and end surface of the piston body (302). The material of the air seal (303) is, for example, resin containing polytetrafluoroethylene (PTFE) as a main component. The air seal (303) seals a clearance between the outer peripheral surface of the piston body (302) and the inner wall surface of the cylinder (300). The seal fixing plate (304) is a metal member formed in a discoid shape having a smaller diameter than that of the piston body (302). The seal fixing plate (304) is fixed to the piston body (302) with, e.g., a bolt, and holds the air seal (303) between the seal fixing plate (304) and the piston body (302).

<Introduction Pipe>

The introduction pipe (242) is a pipe for guiding the treatment target air discharged by the compression-side pump (231*a*) to the first adsorption vessel (234) and the second adsorption vessel (235). One end of the introduction pipe (242) is connected to the discharge port of the compression-side pump (231*a*). The introduction pipe (242) branches into two branch pipes on the other end side, and one branch pipe is connected to the first switching valve (232) and the other branch pipe is connected to the second switching valve (233).

<Suction Pipe>

The suction pipe (243) is a pipe for guiding gas having flowed out of the first adsorption vessel (234) and the second adsorption vessel (235) to the decompression-side pump (231*b*). One end of the suction pipe (243) is connected to the suction port of the decompression-side pump (231*b*). The suction pipe (243) branches into two branch pipes on the other end side, and one branch pipe is connected to the first switching valve (232) and the other branch pipe is connected to the second switching valve (233).

<Supply Pipe>

The supply pipe (244) is a pipe for guiding gas discharged by the decompression-side pump (231*b*) to the internal flow path (20). One end of the supply pipe (244) is connected to the discharge port of the decompression-side pump (231*b*). The other end of the supply pipe (244) opens into a portion of the internal flow path (20) downstream of the internal fan (35).

The supply pipe (244) is provided with a check valve (264) and a supply-side on-off valve (273) in this order from one end to the other end thereof. The check valve (264) allows air to flow only from one end to the other end of the supply pipe (244), and prevents backflow of the air. The supply-side on-off valve (273) is an on-off valve configured as an electromagnetic valve.

<Switching Valve>

Each of the first switching valve (232) and the second switching valve (233) is a switching valve having three ports. Each of the first switching valve (232) and the second switching valve (233) is configured to switch between a first state in which a first port communicates with a second port so as to be blocked from a third port and a second state in which the first port communicates with the third port so as to be blocked from the second port.

The first switching valve (232) has its first port connected to one end of the first adsorption vessel (234). The first switching valve (232) has its second port connected to the corresponding branch pipe of the introduction pipe (242), and has its third port connected to the corresponding branch pipe of the suction pipe (243). The first switching valve (232) switches between a state in which the first adsorption vessel (234) is connected to the compression-side pump (231*a*) and a state in which the first adsorption vessel (234) is connected to the decompression-side pump (231*b*).

The second switching valve (233) has its first port connected to one end of the second adsorption vessel (235). The second switching valve (233) has its second port connected to the corresponding branch pipe of the introduction pipe (242), and has its third port connected to the corresponding branch pipe of the suction pipe (243). The second switching valve (233) switches between a state in which the second adsorption vessel (235) is connected to the compression-side pump (231*a*) and a state in which the second adsorption vessel (235) is connected to the decompression-side pump (231*b*).

The first switching valve (232) and the second switching valve (233) form a switching mechanism (320). The switching mechanism (320) switches a flow path of treatment target air discharged by the compression-side pump (231*a*) and a flow path of gas sucked into the decompression-side pump (231*b*).

<Adsorption Vessel>

Each of the first adsorption vessel (234) and the second adsorption vessel (235) is a member including a cylindrical container with both ends closed and an adsorbent filling the container.

The adsorbent filling these adsorption vessels (234, 235) adsorbs nitrogen and water (water vapor) in the treatment target air in a state in which the adsorption vessels (234, 235) are compressed to have a higher pressure than an atmospheric pressure, and desorbs the nitrogen and the water in a state in which the adsorption vessels (234, 235) are decompressed to have a lower pressure than the atmospheric pressure. Examples of the adsorbent having these properties include porous zeolite having pores with a diameter smaller than the diameter of nitrogen molecules (3.0 angstrom) and greater than the diameter of oxygen molecules (2.8 angstrom).

<Discharge Pipe>

The discharge pipe (245) branches into two branch pipes one one end side. One of the branch pipes is connected to the other end of the first adsorption vessel (234), and the other branch pipe is connected to the other end of the second adsorption vessel (235). Each of the branch pipes of the discharge pipe (245) is provided with one check valve (261). Each of the check valves (261) allows air to flow in a direction in which the air flows out of the corresponding adsorption vessel (234, 235), and prevents backflow of the air.

The discharge pipe (245) extends to the outside of the unit case (201). The other end of the discharge pipe (245) opens into the external chamber (25) of the transport container (1). A joined portion of the discharge pipe (245) is provided with a check valve (262) and an orifice (263). The check valve (262) is arranged closer to the other end of the discharge pipe (245) with respect to the orifice (263). The check valve (262) allows air to flow toward the other end of the discharge pipe (245), and prevents backflow of the air.

<Purge Pipe>

A purge pipe (250) is connected to each branch pipe of the discharge pipe (245). The purge pipe (250) has one end connected to the branch pipe connected to the first adsorption vessel (234) and the other end connected to the branch pipe connected to the second adsorption vessel (235). The one end of the purge pipe (250) is connected between the first adsorption vessel (234) and the corresponding check valve (261). The other end of the purge pipe (250) is connected between the second adsorption vessel (235) and the corresponding check valve (261).

The purge pipe (250) is provided with a purge valve (251). The purge valve (251) is an on-off valve configured as an electromagnetic valve. The purge valve (251) is opened to equalize the pressures of the first adsorption vessel (234) and the second adsorption vessel (235). Portions of the purge pipe (250) on both sides of the purge valve (251) each have an orifice (252).

<Exhaust Connection Pipe>

An exhaust connection pipe (271) is connected to the supply pipe (244). The exhaust connection pipe (271) has one end connected to the supply pipe (244) and the other end connected to the discharge pipe (245). The one end of the exhaust connection pipe (271) is connected to a portion of the supply pipe (244) between the decompression-side pump (231*b*) and the check valve (264). The other end of the exhaust connection pipe (271) is connected to a portion of the discharge pipe (245) closer to the outside than the check valve (262).

The exhaust connection pipe (271) is provided with an exhaust on-off valve (272). The exhaust on-off valve (272) is an on-off valve configured as an electromagnetic valve. The exhaust on-off valve (272) is opened to discharge air flowing through the supply pipe (244) to the outside.

<Measurement Pipe>

A measurement pipe (281) is connected to the supply pipe (244). The measurement pipe (281) is a pipe connecting the supply pipe (244) to the sensor unit (160). One end of the measurement pipe (281) is connected to a portion of the supply pipe (244) between the check valve (264) and the supply-side on-off valve (273). The other end of the measurement pipe (281) is connected to the sensor unit (160).

The measurement pipe (281) is provided with a measurement on-off valve (282). The measurement on-off valve (282) is an on-off valve configured as an electromagnetic valve. The measurement on-off valve (282) is opened to send air flowing through the supply pipe (244) to the sensor unit (160).

<Bypass Pipe>

A bypass connection pipe (255) is connected to the introduction pipe (242). The bypass connection pipe (255) is a pipe for supplying the outside air to the storage space (5) of the transport container (1) with the first adsorption vessel (234) and the second adsorption vessel (235) bypassed. One end of the bypass connection pipe (255) is connected between the branch point of the introduction pipe (242) and the compression-side pump (231*a*). The other end of the bypass connection pipe (255) is connected between the one end of the measurement pipe (281) and the measurement on-off valve (282).

The bypass connection pipe (255) is provided with a bypass on-off valve (256). The bypass on-off valve (256) is an on-off valve configured as an electromagnetic valve. The bypass on-off valve (256) is opened to supply the outside air discharged by the compression-side pump (231*a*) to the storage space (5) without changing the composition of the outside air.

<Sensor Unit>

The sensor unit (160) includes an oxygen sensor (161), a carbon dioxide sensor (162), and a sensor case (163).

The oxygen sensor (161) is, for example, a sensor of zirconia current type that measures the oxygen concentration of mixed gas such as air. The carbon dioxide sensor (162) is, for example, a non-dispersive infrared (NDIR) sensor that measures the carbon dioxide concentration of mixed gas such as air. The oxygen sensor (161) and the carbon dioxide sensor (162) are housed in the sensor case (163).

The sensor case (163) is a box-like member. The sensor case (163) includes an air filter (164). The air filter (164) is a membrane filter for capturing dust etc. contained in the inside air. The air filter (164) filters the inside air flowing into the sensor case (163).

The measurement pipe (281) is connected to the sensor case (163). An outlet pipe (165) is connected to the sensor case (163). The outlet pipe (165) has its inlet end connected to the sensor case (163), and has its outlet end opened to upstream of the internal fan (35) in the internal flow path (20).

When the measurement on-off valve (282) is closed, the inside air flows through the sensor case (163). Specifically, the inside air flowing through the internal flow path (20) flows into the sensor case (163) through the air filter (164), flows through the outlet pipe (165) after having passed through the sensor case (163), and flows into the suction side of the internal fan (35) in the internal flow path (20). Thus, when the measurement on-off valve (282) is closed, the oxygen sensor (161) measures the oxygen concentration of the inside air, and the carbon dioxide sensor (162) measures the carbon dioxide concentration of the inside air.

On the other hand, when the measurement on-off valve (282) is open, gas flowing through the measurement pipe (281) flows through the sensor case (163). Specifically, gas flowing through the supply pipe (244) or the bypass connection pipe (255) flows into the sensor case (163) through the measurement pipe (281), flows through the outlet pipe (165) after having passed through the sensor case (163), and flows into the suction side of the internal fan (35) in the internal flow path (20). Thus, when the measurement on-off valve (282) is open, the oxygen sensor (161) measures the oxygen concentration of the gas flowing from the measurement pipe (281) into the sensor case (163), and the carbon dioxide sensor (162) measures the carbon dioxide concentration of the gas flowing from the measurement pipe (281) into the sensor case (163).

<Ventilation Exhaust Pipe>

The ventilation exhaust pipe (150) is a pipe for discharging the air in the transport container (1) to the external space. The ventilation exhaust pipe (150) penetrates the division wall (12) of the refrigeration apparatus (10) for transport. The ventilation exhaust pipe (150) is provided with a ventilation exhaust valve (151). The ventilation exhaust valve (151) is an on-off valve configured as an electromagnetic valve.

<Controller>

Figure 6:
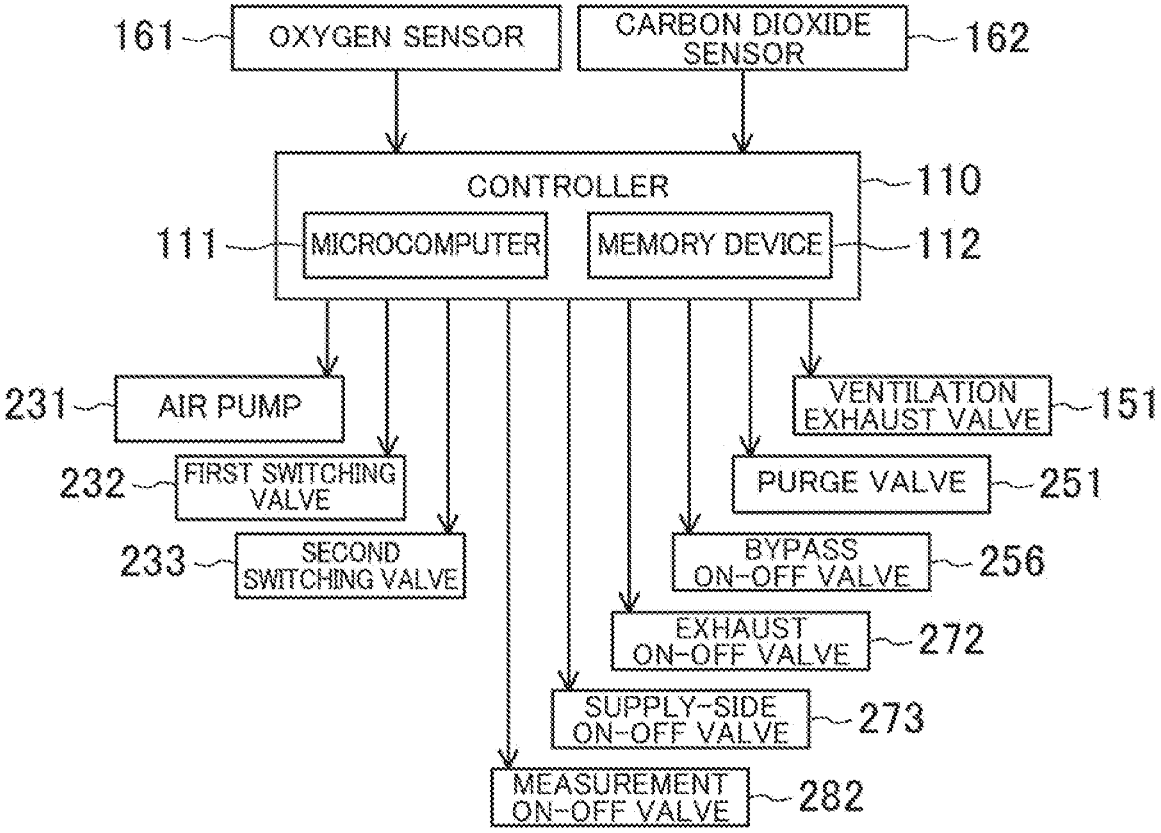
FIG. 6 is a block diagram illustrating the configuration of a controller of the inside air control system of the embodiment.

As illustrated in FIG. 6, the controller (110) includes a microcomputer (111) mounted on a control board and a memory device (112) storing software for operating the microcomputer (111). The memory device (112) is a semiconductor memory.

The controller (110) controls the components of the inside air control system (100). The controller (110) receives measurement values of the oxygen sensor (161) and the carbon dioxide sensor (162). The controller (110) controls the air pump (231), a first switching valve (136), and a second switching valve (137). In addition, the controller (110) controls the ventilation exhaust valve (151), the purge valve (251), the bypass on-off valve (256), the exhaust on-off valve (272), the supply-side on-off valve (273), and the measurement on-off valve (282).

—Operation and Action of Inside Air Control System—

The inside air control system (100) adjusts the composition of the air in the storage space (5) of the transport container (1) (in this embodiment, the oxygen concentration and carbon dioxide concentration of the inside air). Operation and action of the inside air control system (100) will be described with reference to an example where the target range of the oxygen concentration of the inside air is 5%±1% and the target range of the carbon dioxide concentration of the inside air is 2%±1%.

The inside air control system (100) of this embodiment performs an adjustment operation of decreasing the oxygen concentration and carbon dioxide concentration of the air in the storage space (5), and performs an outside air introduction operation of increasing the oxygen concentration of the air in the storage space (5). In the adjustment operation, the inside air control system (100) supplies the nitrogen-enriched gas generated from the outside air (atmospheric air), which is the treatment target air, to the storage space (5). In the outside air introduction operation, the inside air control system (100) directly supplies the outside air (atmospheric air) to the storage space (5).

The controller (110) of the inside air control system (100) determines, based on the measurement values of the oxygen sensor (161) and the carbon dioxide sensor (162), the start and stop of the adjustment operation and the start and stop of the outside air introduction operation.

The composition of the air in the storage space (5) at the time when loading of the transport container (1) with cargos (6) is completed is substantially the same as the composition of the atmospheric air (nitrogen concentration: 78%, oxygen concentration: 21%, carbon dioxide concentration: 0.04%). Thus, the inside air control system (100) performs the adjustment operation to decrease the oxygen concentration of the inside air. When the oxygen concentration of the inside air reaches the upper limit (6%) of the target range, the inside air control system (100) stops the adjustment operation.

After the oxygen concentration of the inside air has reached 6% and the inside air control system (100) has stopped the adjustment operation, breathing of the fresh products housed in the storage space (5) gradually decreases the oxygen concentration of the inside air, and simultaneously and gradually increases the carbon dioxide concentration of the inside air.

When the carbon dioxide concentration of the inside air reaches the upper limit (3%) of the target range, the inside air control system (100) performs the adjustment operation to decrease the carbon dioxide concentration of the inside air. When the carbon dioxide concentration of the inside air reaches the lower limit (1%) of the target range, the inside air control system (100) stops the adjustment operation.

When the oxygen concentration of the inside air reaches the lower limit (4%) of the target range, the inside air control system (100) performs the outside air introduction operation to increase the oxygen concentration of the inside air. When the oxygen concentration of the inside air reaches the upper limit (6%) of the target range, the inside air control system (100) stops the outside air introduction operation.

As described above, the inside air control system (100) performs the adjustment operation to decrease the oxygen concentration of the air in the storage space (5) from 21% (oxygen concentration of the atmospheric air) to the target range. The inside air control system (100) repeatedly performs the adjustment operation and the outside air introduction operation to maintain the oxygen concentration and carbon dioxide concentration of the air in the storage space (5) within the respective target ranges.

—Adjustment Operation of Inside Air Control System—

In the adjustment operation, the inside air control system (100) separates the outside air (atmospheric air) which is the treatment target air into the nitrogen-enriched gas and the oxygen-enriched gas, and supplies the nitrogen-enriched gas to the storage space (5) and supplies the oxygen-enriched gas to the external space. Moreover, in the adjustment operation, the ventilation exhaust valve (151) is opened, and the inside air is discharged to the external space through the ventilation exhaust pipe (150).

In the adjustment operation, the flow rate of the nitrogen-enriched gas supplied to the storage space (5) by the inside air control system (100) is higher than the flow rate of the inside air discharged from the storage space (5) by the inside air control system (100). Thus, the storage space (5) is maintained at a positive pressure.

In the adjustment operation, the inside air control system (100) alternately and repeatedly performs each of a first action and a second action for a predetermined switching time (second time T2). The switching time (T2) is set to, for example, 14 seconds. The controller (110) controls the first switching valve (232) and the second switching valve (233) such that the first action and the second action are alternately performed.

<First Action>

Figure 7:
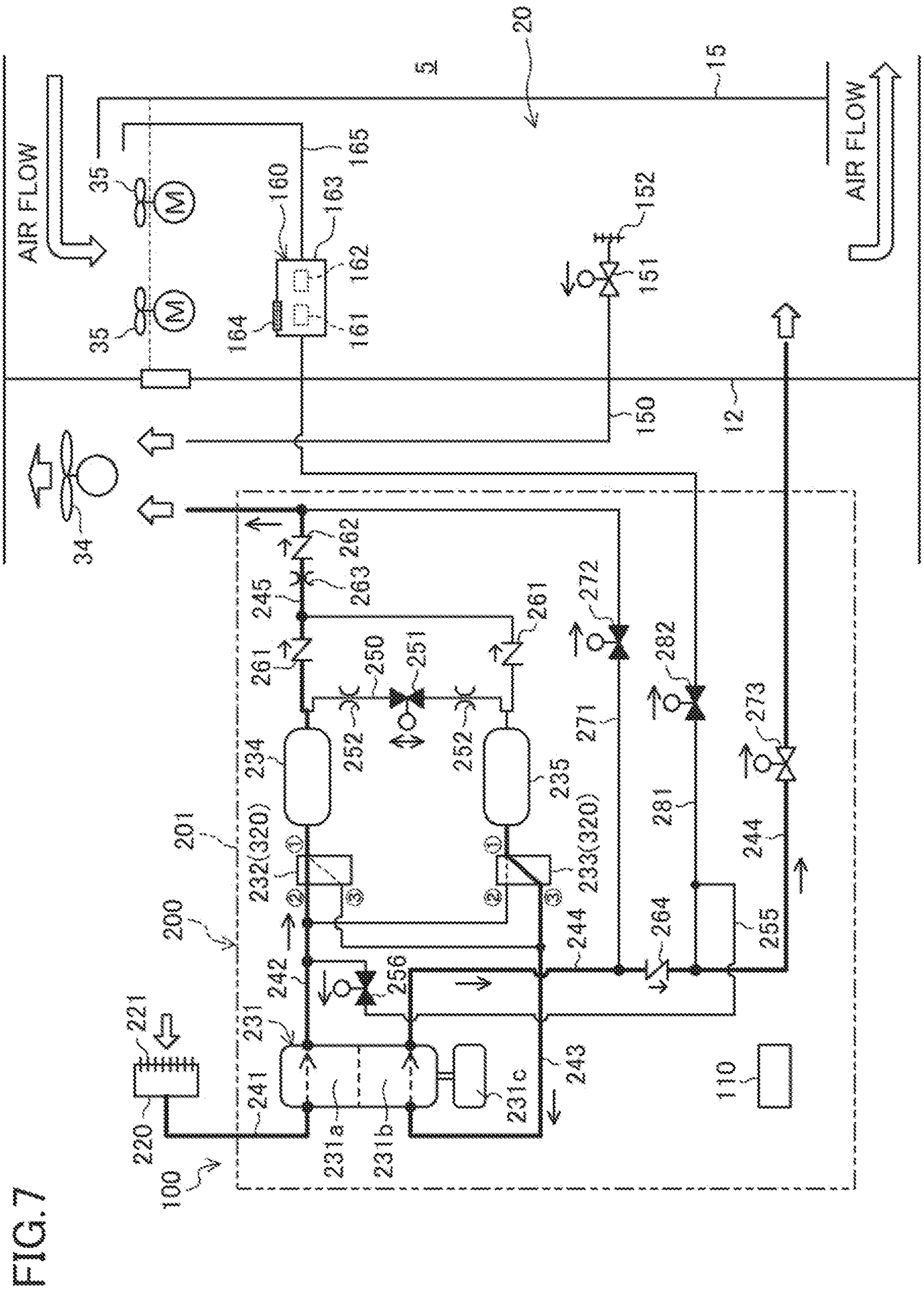
FIG. 7 is a diagram of the inside air control system performing a first action in an adjustment operation, FIG. 7 corresponding to FIG. 4.

As illustrated in FIG. 7, in the first action, the first switching valve (232) is set to the first state, and the second switching valve (233) is set to the second state. In the first action, the supply-side on-off valve (273) is opened, and the remaining on-off valves (251, 256, 272, 282) are closed. In the first action, the air pump (231) operates to perform an adsorption action for the first adsorption vessel (234) and a desorption action for the second adsorption vessel (235).

In the first action, the discharge port of the compression-side pump (231*a*) is connected to the first adsorption vessel (234), and the pipe extending from the compression-side pump (231*a*) to the first adsorption vessel (234) forms the flow path of the treatment target air. In addition, in the first action, the second adsorption vessel (235) is connected to the suction port of the decompression-side pump (231*b*), and the pipe extending from the second adsorption vessel (235)

to the decompression-side pump (231*b*) forms the flow path of the gas sucked into the decompression-side pump (231*b*). As will be described later, the gas sucked into the decompression-side pump (231*b*) during the first action is the nitrogen-enriched gas. Thus, the flow path of the gas sucked into the decompression-side pump (231*b*) is the flow path of the nitrogen-enriched gas.

The compression-side pump (231*a*) sucks the treatment target air from the outside air pipe (241), compresses the sucked treatment target air, and supplies the compressed treatment target air to the first adsorption vessel (234). In the first adsorption vessel (234), the adsorbent adsorbs nitrogen and water contained in the supplied treatment target air. As a result, the first adsorption vessel (234) generates the oxygen-enriched gas having a lower nitrogen concentration and a higher oxygen concentration than those of the treatment target air. The oxygen-enriched gas flows out of the first adsorption vessel (234), flows through the discharge pipe (245), and is discharged to the external space.

Meanwhile, the decompression-side pump (231*b*) sucks gas from the second adsorption vessel (235). The second adsorption vessel (235) has its internal pressure decreased, and nitrogen and water thus desorb from the adsorbent. As a result, the second adsorption vessel (235) generates the nitrogen-enriched gas having a higher nitrogen concentration and a lower oxygen concentration than those of the treatment target air. The nitrogen-enriched gas flows from the second adsorption vessel (235) into the suction pipe (243), and is sucked into the decompression-side pump (231*b*). The decompression-side pump (231*b*) compresses the sucked nitrogen-enriched gas, and discharges the compressed air to the supply pipe (244). The nitrogen-enriched gas is supplied to the internal flow path (20) through the supply pipe (244).

<Second Action>

Figure 8:
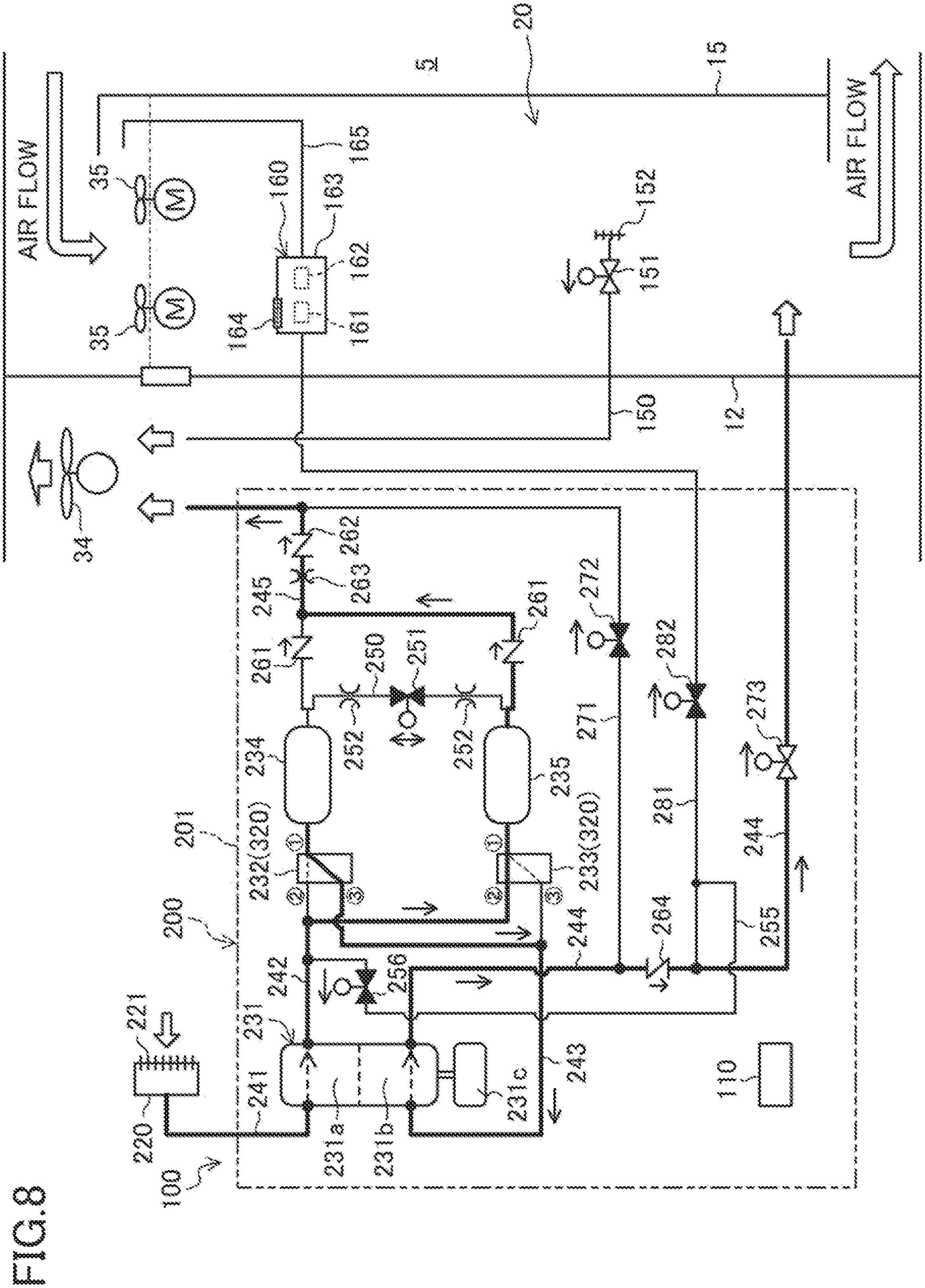
FIG. 8 is a diagram of the inside air control system performing a second action in the adjustment operation, FIG. 8 corresponding to FIG. 4.

As illustrated in FIG. 8, in the second action, the first switching valve (232) is set to the second state, and the second switching valve (233) is set to the first state. In the second action, the supply-side on-off valve (273) is opened, and the remaining on-off valves (251, 256, 272, 282) are closed. In the second action, the air pump (231) operates to perform a desorption action for the first adsorption vessel (234) and an adsorption action for the second adsorption vessel (235).

In the second action, the discharge port of the compression-side pump (231*a*) is connected to the second adsorption vessel (235), and the pipe extending from the compression-side pump (231*a*) to the second adsorption vessel (235) forms the flow path of the treatment target air. In addition, in the second action, the first adsorption vessel (234) is connected to the suction port of the decompression-side pump (231*b*), and the pipe extending from the first adsorption vessel (234) to the decompression-side pump (231*b*) forms the flow path of the gas sucked into the decompression-side pump (231*b*). As will be described later, the gas sucked into the decompression-side pump (231*b*) during the second action is the nitrogen-enriched gas. Thus, the flow path of the gas sucked into the decompression-side pump (231*b*) is the flow path of the nitrogen-enriched gas.

The compression-side pump (231*a*) sucks the treatment target air from the outside air pipe (241), compresses the sucked treatment target air, and supplies the compressed treatment target air to the second adsorption vessel (235). In the second adsorption vessel (235), the adsorbent adsorbs nitrogen and water (water vapor) contained in the supplied treatment target air. As a result, the second adsorption vessel (235) generates the oxygen-enriched gas having a lower nitrogen concentration and a higher oxygen concentration than those of the treatment target air. The oxygen-enriched gas flows out of the second adsorption vessel (235), flows through the discharge pipe (245), and is discharged to the external space.

Meanwhile, the decompression-side pump (231*b*) sucks gas from the first adsorption vessel (234). The first adsorption vessel (234) has its internal pressure decreased, and nitrogen and water thus desorb from the adsorbent. As a result, the first adsorption vessel (234) generates the nitrogen-enriched gas having a higher nitrogen concentration and a lower oxygen concentration than those of the treatment target air. The nitrogen-enriched gas flows from the first adsorption vessel (234) into the suction pipe (243), and is sucked into the decompression-side pump (231*b*). The decompression-side pump (231*b*) compresses the sucked nitrogen-enriched gas, and discharges the compressed air to the supply pipe (244). The nitrogen-enriched gas is supplied to the internal flow path (20) through the supply pipe (244).

—Outside Air Introduction Operation of Inside Air Control System—

In the outside air introduction operation, the inside air control system (100) directly supplies the outside air (atmospheric air) to the storage space (5). Moreover, in the outside air introduction operation, the ventilation exhaust valve (151) is opened, and the inside air is discharged to the external space through the ventilation exhaust pipe (150).

In the outside air introduction operation, the flow rate of the outside air supplied to the storage space (5) by the inside air control system (100) is higher than the flow rate of the inside air discharged from the storage space (5) by the inside air control system (100). Thus, the storage space (5) is maintained at a positive pressure.

Figure 9:
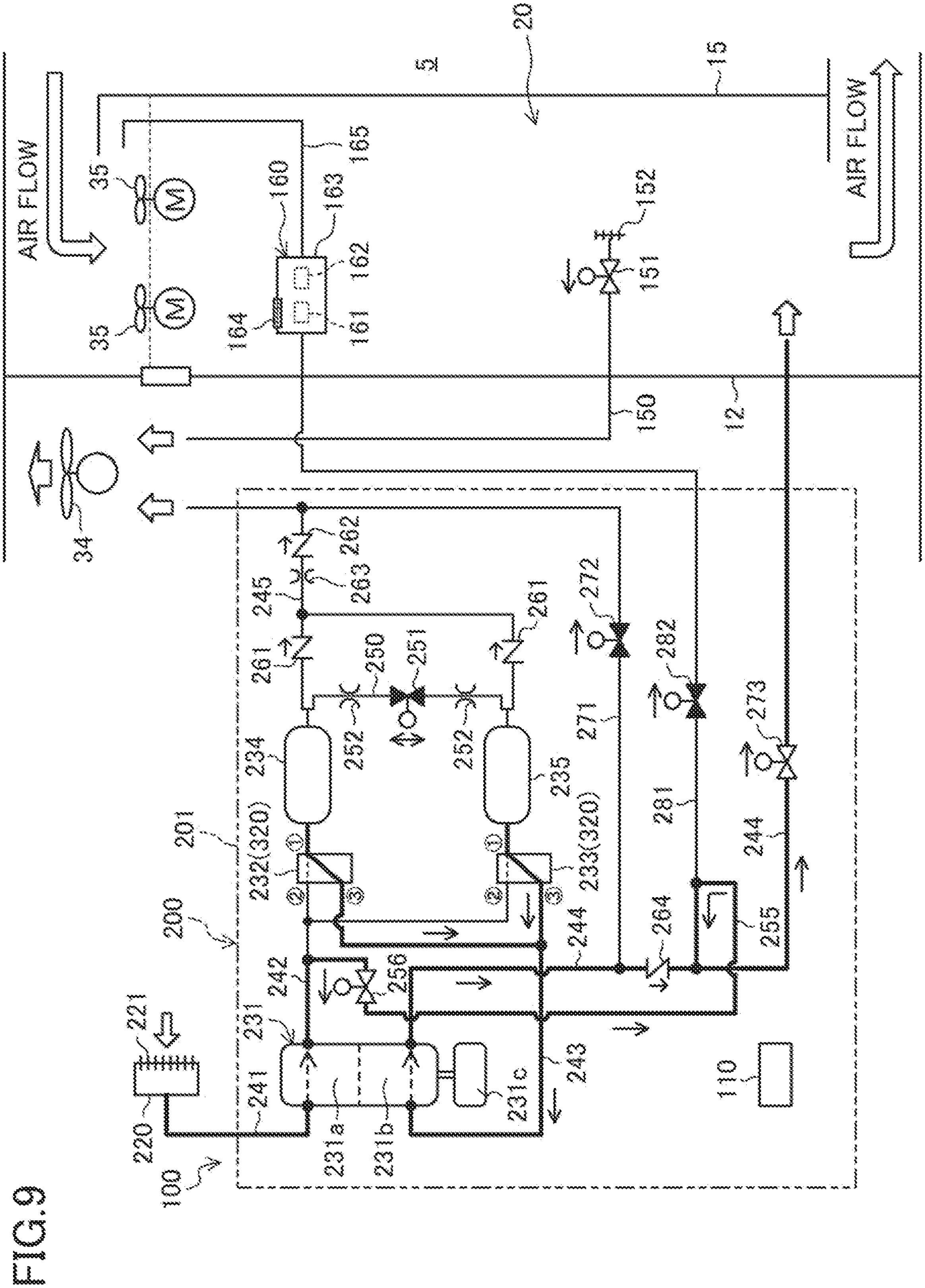
FIG. 9 is a diagram of the inside air control system performing an outside air introduction operation, FIG. 9 corresponding to FIG. 4.

As illustrated in FIG. 9, in the outside air introduction operation, both the first switching valve (232) and the second switching valve (233) are set to the second state. In the outside air introduction operation, the supply-side on-off valve (273) and the bypass on-off valve (256) are opened, and the remaining on-off valves (251, 272, 282) are closed. In the outside air introduction operation, the air pump (231) operates.

The compression-side pump (231*a*) sucks the outside air (atmospheric air) from the outside air pipe (241), compresses the sucked outside air, and discharges the compressed outside air to the introduction pipe (242). The outside air discharged from the compression-side pump (231*a*) flows through the introduction pipe (242), the bypass connection pipe (255), and the supply pipe (244) in this order, and is supplied to the internal flow path (20). As described above, in the outside air introduction operation, the air having the same composition as that of the atmospheric air is supplied to the storage space (5) of the transport container (1).

The decompression-side pump (231*b*) sucks gas from both the first adsorption vessel (234) and the second adsorption vessel (235), and discharges the sucked gas to the supply pipe (244). The gas discharged to the supply pipe (244) by the decompression-side pump (231*b*) is supplied to the internal flow path (20) together with the outside air having flowed into the supply pipe (244) from the bypass connection pipe (255).

When the decompression-side pump (231*b*) sucks the gas from the first adsorption vessel (234) and the second adsorption vessel (235), the pressures of the first adsorption vessel (234) and the second adsorption vessel (235) gradually decrease. Then, when the duration of the outside air introduction operation exceeds a certain time (for example, 45 seconds), the flow rate of the gas sucked by the decompression-side pump (231*b*) reaches substantially zero.

—Pre-Stop Operation of Inside Air Control System—

Figure 10:
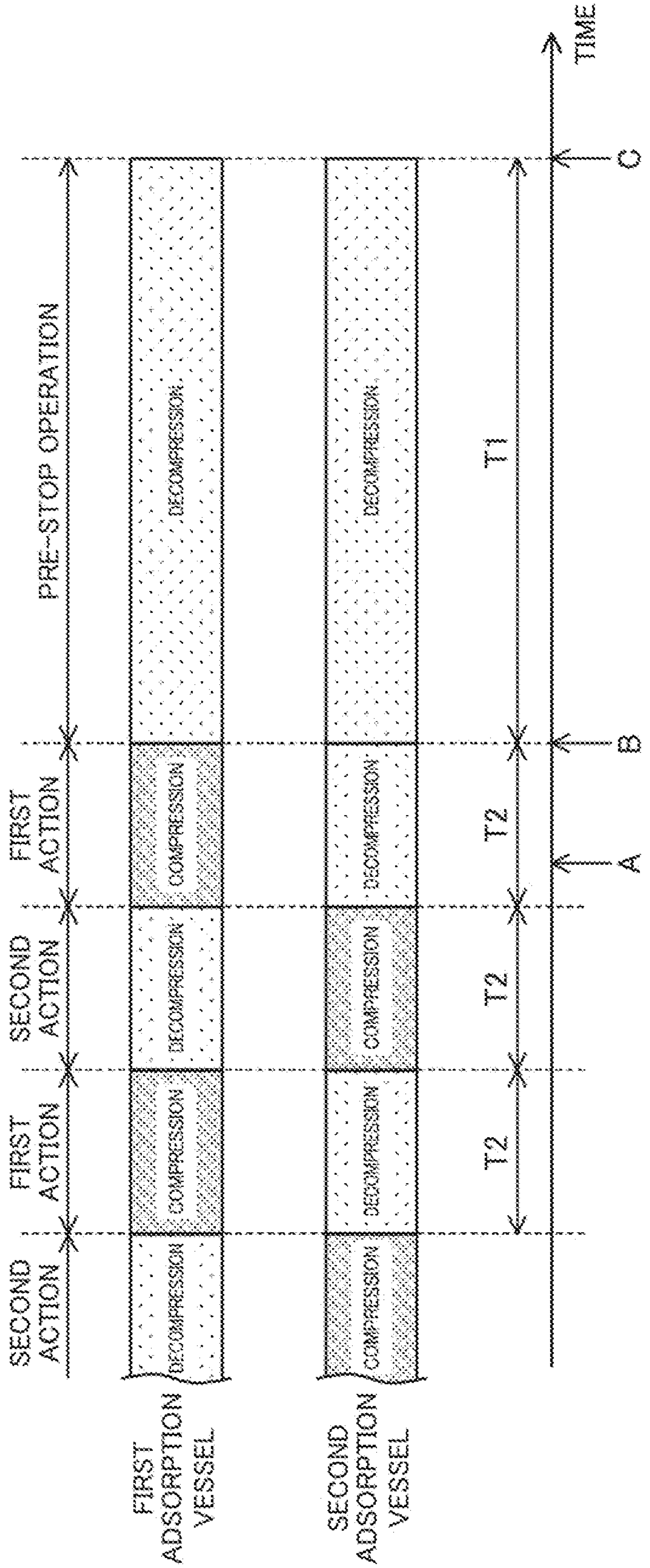
FIG. 10 is a timing chart illustrating action of the inside air control system before and after the adjustment operation is stopped.

When stopping the adjustment operation, the inside air control system (100) stops the air pump (231) after having performed a pre-stop operation. The pre-stop operation is an operation of discharging water from the decompression-side pump (231*b*). In the pre-stop operation of the inside air control system (100), the controller (110) performs stop control. Here, the pre-stop operation of the inside air control system (100) will be described with reference to FIG. 10.

As described above, in the adjustment operation, the inside air control system (100) alternately and repeatedly performs each of the first action and the second action for the switching time (T2). It is assumed that a stop condition is satisfied at the point of time A at which the inside air control system (100) is performing the first action. In this case, the inside air control system (100) continues the first action until the duration of the first action reaches the switching time (T2). In other words, the inside air control system (100) continues the first action until the first action is normally completed.

The stop condition is a condition for stopping the adjustment operation of the inside air control system (100). Examples of the stop condition include a condition where the measurement value of the oxygen sensor (161) reaches a predetermined target value or less and a condition where the measurement value of the carbon dioxide sensor (162) reaches a predetermined target value or less.

When the first action of the inside air control system (100) ends at the point of time B, the controller (110) starts the stop control. Thus, the inside air control system (100) starts the pre-stop operation at the point of time B.

In the pre-stop operation, the inside air control system (100) performs the same action as the outside air introduction operation. Specifically, in the inside air control system (100), the controller (110) first switches the first switching valve (232) from the first state to the second state, and opens the bypass on-off valve (256). In this state, the decompression-side pump (231*b*) sucks gas from both the first adsorption vessel (234) and the second adsorption vessel (235).

Subsequently, the controller (110) continuously operates the air pump (231) for a predetermined decompression time (first time T1). The decompression time (T1) is longer than the switching time T2 which is the durations of the first action and the second action (T2<T1). The decompression time (T1) is preferably at least twice the switching time T2, more preferably at least three times the switching time T2. The decompression time (T1) of this embodiment is 120 seconds.

When the operation time of the air pump (231) from the point of time B exceeds a certain time, the flow rate of the gas sucked by the decompression-side pump (231*b*) reaches substantially zero. In this state, almost no gas components such as nitrogen, oxygen, and water remain in the cylinder (300) of the decompression-side pump (231*b*).

At the point of time C after a lapse of the decompression time (T1) from the point of time B, the controller (110) cuts off the power supplied to the drive motor (231*c*) to stop the air pump (231). As described above, when the adjustment operation of the inside air control system (100) is stopped, the decompression-side pump (231*b*) is stopped in a state in which almost no water remains therein. Thus, even when the air pump (231) stops and the temperature of the decompression-side pump (231*b*) decreases, dew condensation does not occur inside the cylinder (300) of the decompression-side pump (231*b*).

The stop condition may be satisfied while the inside air control system (100) is performing the second action. In this case, if the duration of the second action performed by the inside air control system (100) reaches the switching time (T2) when the stop condition is satisfied, the controller (110) starts the stop control. In the stop control in this case, the controller (110) switches the second switching valve (233) from the first state to the second state, and opens the bypass on-off valve (256). In this state, the controller (110) continuously operates the decompression-side pump (231*b*) for the decompression time (T1), and then, stops the air pump (231).

Feature (1) of Embodiment

When the adjustment operation is stopped, the conventional inside air control system switches the switching mechanism such that "one of the first and second adsorption vessels (234), (235), to which the compression-side pump supplies the treatment target air, when the stop condition is satisfied" is connected to the decompression-side pump, and then, immediately stops the decompression-side pump. In this case, the adsorption vessel compressed until immediately before the switching mechanism is switched communicates with the decompression-side pump. The pressure of the adsorption vessel compressed until immediately before the switching mechanism is switched is higher than the internal pressure of the cylinder of the decompression-side pump. Thus, even after the decompression-side pump has been stopped, gas containing a relatively-large amount of water flows from the adsorption vessel into the decompression-side pump due to a pressure difference between the adsorption vessel and the decompression-side pump. Accordingly, when the temperature of the decompression-side pump decreases after the decompression-side pump has been stopped, dew condensation occurs inside the decompression-side pump.

In the decompression-side pump (231*b*) which is the oilless pump, the air seal (303) of the piston (301) is rubbed against the inner wall surface of the cylinder (300). Part of the air seal (303) adheres the inner wall surface of the cylinder (300), thereby reducing friction between the inner wall surface of the cylinder (300) and the air seal (303).

However, when dew condensation occurs on the inner wall surface of the cylinder (300), the inner wall surface of the cylinder (300) gets wet with water, and part of the air seal (303) adhering the inner wall surface of the cylinder (300) is easily detached. For this reason, when the decompression-side pump (231*b*) is started in this state, part of the air seal (303) adhering the inner wall surface of the cylinder (300) is scraped off from the inner wall surface of the cylinder (300) by the air seal (303) of the moving piston (301). When the temperature of the decompression-side pump (231*b*) increases and the inner wall surface of the cylinder (300) is dried, part of the air seal (303) again adheres the inner wall surface of the cylinder (300). It is assumed that due to occurrence of such a phenomenon, the amount of wear of the air seal (303) increases when dew condensation occurs in the decompression-side pump (231*b*) while the decompression-side pump (231*b*) is stopped.

In order to prevent such a phenomenon, the controller (110) of the inside air control system (100) of this embodiment performs the stop control when the stop condition for stopping the adjustment operation is satisfied. In the stop control, the controller (110) controls the switching mechanism (320) such that the decompression-side pump (231*b*) sucks gas from "one of the first and second adsorption vessels (234). (235), to which the compression-side pump (231*a*) supplies the treatment target air, when the stop condition is satisfied," and operates the decompression-side pump (231*b*) for the predetermined decompression time (T1) and then stops the decompression-side pump (231*b*).

When the controller (110) performs the stop control, the decompression-side pump (231*b*) stops in a state in which the amount of water (water vapor) remaining therein is small. As a result, dew condensation inside the decompression-side pump (231*b*) thus stopped is reduced, and the inner wall surface of the cylinder (300) of the decompression-side pump (231*b*) is kept dry while the decompression-side pump (231*b*) is stopped. Thus, according to this embodiment, the amount of wear of the air seal (303) after the decompression-side pump (231*b*) has been restarted can be reduced, and the reliability of the inside air control system (100) can be improved.

Feature (2) of Embodiment

In the inside air control system (100) of this embodiment, the decompression time (T1) for which the decompression-side pump (231*b*) operates in the stop control by the controller (110) is longer than the switching time T2 which is the duration of the first action and the second action in the adjustment operation of the inside air control system (100).

Here, the switching time T2 is usually a time required for the decompression-side pump (231*b*) to discharge most of nitrogen and water from the adsorption vessel (234, 235). Thus, if the decompression-side pump (231*b*) continuously sucks gas from the adsorption vessel (234, 235) for a time longer than the switching time T2, almost no nitrogen and water remain in the adsorption vessel (234, 235), and the flow rate of the gas sucked by the decompression-side pump (231*b*) reaches substantially zero.

Thus, in the stop control by the controller (110), if the decompression-side pump (231*b*) operates for the decompression time T1 longer than the switching time T2, almost no gas components such as nitrogen, oxygen, and water remain in the cylinder (300) of the decompression-side pump (231*b*). In addition, since almost no nitrogen and water remain in the adsorption vessel (234, 235), water does not flow from the adsorption vessel (234, 235) into the cylinder (300) of the decompression-side pump (231*b*) while the decompression-side pump (231*b*) is stopped. Thus, according to this embodiment, the inner wall surface of the cylinder (300) can be kept dry while the decompression-side pump (231*b*) is stopped, and the amount of wear of the air seal (303) after the decompression-side pump (231*b*) has been restarted can be reduced.

Feature (3) of Embodiment

In the stop control, the controller (110) of the inside air control system (100) of this embodiment controls the switching mechanism (320) such that both the first adsorption vessel (234) and the second adsorption vessel (235) are connected to the decompression-side pump (231*b*). Thus, at the time when the decompression-side pump (231*b*) is stopped, almost no nitrogen and water remain in both the first adsorption vessel (234) and the second adsorption vessel (235). Consequently, according to this embodiment, the adsorbent in the adsorption vessel (234, 235) can be kept dry while the inside air control system (100) is stopped, and deterioration of the adsorbent can be reduced.

Feature (4) of Embodiment

The inside air control system (100) of this embodiment repeats the start and stop of the adjustment operation in accordance with the measurement values of the oxygen sensor (161) and the carbon dioxide sensor (162). If the adjustment operation is repeatedly started and stopped in the conventional inside air control system, the air seal (303) is worn more frequently when the decompression-side pump (231*b*) is started, and the life of the air seal (303) may be shortened.

However, in the inside air control system (100) of this embodiment, the controller (110) performs the stop control to reduce the amount of wear of the air seal (303). Thus, according to this embodiment, even in the case of the inside air control system (100) in which the adjustment operation is frequently started and stopped, the amount of wear of the air seal (303) can be reduced and the reliability of the inside air control system (100) can be improved.

Other Embodiments

The inside air control system (100) of each of the foregoing embodiments may be modified in the following manner. The following variations may be combined or replaced as needed, as long as the functions of the inside air control system (100) are not impaired.

First Variation

In the inside air control system (100) of the above embodiment, a drive motor may be coupled to each of the compression-side pump (231*a*) and the decompression-side pump (231*b*). In the present variation, the compression-side pump (231*a*) and the decompression-side pump (231*b*) can be individually operated or stopped. In the stop control, the controller (110) of this variation may stop the compression-side pump (231*a*) at the same time as switching the switching mechanism (320), and stop the decompression-side pump (231*b*) after having continuously operated the decompression-side pump (231*b*) for the decompression time T1.

Second Variation

The inside air control system (100) of each of the above embodiments may be installed in a stationary refrigerator or freezer. The inside air control system (100) of each of the above embodiments may be installed in a refrigerated/freezing container for overland transportation to be transported by, e.g., a truck or a rail. The inside air control system (100) of each of the above embodiments may be installed in a refrigerated/freezing truck including a box defining a cargo space and integrated with the chassis of the truck.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure. The ordinal numbers such as "first," "second," . . . in the description and claims are used to distinguish the terms to which these expressions are given, and do not limit the number and order of the terms.

INDUSTRIAL APPLICABILITY

As can be seen from the foregoing description, the present invention is useful for an inside air control system, a refrigeration apparatus, and a transport container.

DESCRIPTION OF REFERENCE CHARACTERS

1 Transport Container
2 Storage

10 Refrigeration Apparatus
30 Refrigerant Circuit
100 Inside air control system
110 Controller
161 Oxygen Sensor (Sensor)
162 Carbon Dioxide Sensor (Sensor)
231*a* Compression-Side Pump (First Pump)
231*b* Decompression-side Pump (Second Pump)
232 First Switching Valve
233 Second Switching Valve
234 First Adsorption vessel
235 Second Adsorption vessel
320 Switching Mechanism

The invention claimed is:

1. An inside air control system for performing an adjustment operation of adjusting a composition of inside air in a storage, comprising:

a first adsorption vessel and a second adsorption vessel each having an adsorbent for adsorbing nitrogen and water;

a first pump configured to supply treatment target air to the first adsorption vessel and the second adsorption vessel;

a second pump which is an oilless pump configured to suck gas from the first adsorption vessel and the second adsorption vessel and supply the gas into the storage;

a switching mechanism configured to switch a flow path of the treatment target air discharged by the first pump and a flow path of the gas sucked into the second pump; and a controller configured to control the first pump, the second pump, and the switching mechanism, wherein, in the adjustment operation, the controller is configured to control the switching mechanism to alternately perform a first action in which the first pump supplies the treatment target air to the first adsorption vessel and the second pump sucks the gas from the second adsorption vessel and a second action in which the first pump supplies the treatment target air to the second adsorption vessel and the second pump sucks the gas from the first adsorption vessel, and is further configured to, when a stop condition for stopping the adjustment operation is satisfied, the controller control the switching mechanism such that the second pump sucks the gas from one of the first adsorption vessel or the second adsorption vessel, to which the first pump supplies the treatment target air, when the stop condition is satisfied, and perform stop control for stopping the second pump after having operated the second pump for a predetermined first time.

2. The inside air control system of claim 1, wherein in the adjustment operation, the controller controls the switching mechanism such that each of the first action and the second action is alternately performed for a predetermined second time, and the first time is longer than the second time.

3. The inside air control system of claim 2, wherein when the stop condition is satisfied, the controller starts the stop control when a duration of one of the first action or the second action performed when the stop condition is satisfied reaches the second time.

4. The inside air control system of claim 1, wherein in the stop control, the controller controls the switching mechanism such that the second pump sucks the gas from both the first adsorption vessel and the second adsorption vessel.

5. The inside air control system of claim 2, wherein in the stop control, the controller controls the switching mechanism such that the second pump sucks the gas from both the first adsorption vessel and the second adsorption vessel.

6. The inside air control system of claim 3, wherein in the stop control, the controller controls the switching mechanism such that the second pump sucks the gas from both the first adsorption vessel and the second adsorption vessel.

7. The inside air control system of claim 1, wherein the switching mechanism includes a first switching valve configured to switch between a state in which the first adsorption vessel is connected to a discharge port of the first pump and a state in which the first adsorption vessel is connected to a suction port of the second pump, and a second switching valve configured to switch between a state in which the second adsorption vessel is connected to the discharge port of the first pump and a state in which the second adsorption vessel is connected to the suction port of the second pump.

8. The inside air control system of claim 6, wherein the switching mechanism includes a first switching valve configured to switch between a state in which the first adsorption vessel is connected to a discharge port of the first pump and a state in which the first adsorption vessel is connected to a suction port of the second pump, and a second switching valve configured to switch between a state in which the second adsorption vessel is connected to the discharge port of the first pump and a state in which the second adsorption vessel is connected to the suction port of the second pump.

9. The inside air control system of claim 1, further comprising:

a sensor configured to measure a concentration of a specific component in the inside air in the storage, wherein the controller determines stop and start of the adjustment operation based on a measurement value of the sensor.

10. The inside air control system of claim 8, further comprising:

a sensor configured to measure a concentration of a specific component in the inside air in the storage, wherein the controller determines stop and start of the adjustment operation based on a measurement value of the sensor.

11. A refrigeration apparatus comprising:

the inside air control system of claim 1; and a refrigerant circuit configured to perform a refrigeration cycle to adjust an internal temperature of the storage.

12. A transport container comprising:

the refrigeration apparatus of claim 11; and a container body to which the refrigeration apparatus is attached to form the storage.

* * * * *